United States Patent
Mirzazadeh (10) Patent No.: US 9,272,680 B1
(45) Date of Patent: Mar. 1, 2016

(54) AIRBAG FOR PROTECTION OF MULTIPLE BODY REGIONS

(75) Inventor: Abbas Mirzazadeh, Kenmore, WA (US)

(73) Assignee: THE BOEING COMPANY, Chicago, IL (US)

( * ) Notice: Subject to any disclaimer, the term of this patent is extended or adjusted under 35 U.S.C. 154(b) by 1225 days.

(21) Appl. No.: 12/816,221

(22) Filed: Jun. 15, 2010

(51) Int. Cl.
*B60R 21/207* (2006.01)
*B60R 21/231* (2011.01)

(52) U.S. Cl.
CPC ..... *B60R 21/207* (2013.01); *B60R 2021/23169* (2013.01)

(58) Field of Classification Search
CPC .................. B60R 21/207; B60R 2021/23169
USPC .......... 280/730.1, 734; 2/455; 244/118.5, 121
See application file for complete search history.

(56) References Cited

U.S. PATENT DOCUMENTS

| | | | | |
|---|---|---|---|---|
| 2,418,798 A * | 4/1947 | Whitmer | ........................ | 244/121 |
| 3,243,822 A * | 4/1966 | Lipkin | ............................... | 2/455 |
| 3,614,128 A * | 10/1971 | Sobkow | ..................... | 280/730.1 |
| 3,642,303 A * | 2/1972 | Irish et al. | .................. | 280/730.1 |
| 3,664,682 A * | 5/1972 | Wycech | ...................... | 280/730.1 |
| 3,675,942 A * | 7/1972 | Huber | ........................ | 280/738 |
| 3,817,553 A * | 6/1974 | Wilfert | .......................... | 280/752 |
| 3,837,670 A * | 9/1974 | Hilyard | .......................... | 280/753 |
| 3,953,049 A * | 4/1976 | Surace et al. | .............. | 280/730.1 |
| 4,043,572 A * | 8/1977 | Hattori et al. | ................. | 280/738 |
| 4,290,627 A * | 9/1981 | Cumming et al. | ............ | 280/729 |
| 4,765,569 A * | 8/1988 | Higgins | ..................... | 244/118.5 |
| 5,240,283 A * | 8/1993 | Kishi et al. | ..................... | 280/729 |
| 5,324,070 A * | 6/1994 | Kitagawa et al. | .......... | 280/730.1 |
| 5,470,103 A * | 11/1995 | Vaillancourt et al. | ...... | 280/730.1 |
| 5,692,710 A * | 12/1997 | Gee, Sr. | ...................... | 244/118.5 |
| 5,934,701 A * | 8/1999 | Furukawa | .................. | 280/730.1 |
| 6,283,500 B1* | 9/2001 | Eckert et al. | ............... | 280/730.1 |
| 6,702,322 B2* | 3/2004 | Eyrainer et al. | ........... | 280/730.1 |
| 6,712,385 B2* | 3/2004 | Enders | ....................... | 280/730.1 |
| 6,932,380 B2* | 8/2005 | Choi | .......................... | 280/730.1 |
| 7,090,245 B2* | 8/2006 | Yoshikawa et al. | ........... | 280/729 |
| 7,338,069 B2* | 3/2008 | Breed | ........................... | 280/729 |
| 7,523,956 B2* | 4/2009 | Zumpano | ................... | 280/730.1 |
| 7,607,683 B2* | 10/2009 | Fischer et al. | ............. | 280/730.1 |
| 7,661,700 B2* | 2/2010 | Imamura et al. | ........... | 280/730.1 |
| 7,681,909 B2* | 3/2010 | Idomoto et al. | ............... | 280/729 |
| 7,731,229 B2* | 6/2010 | Song et al. | ..................... | 280/732 |
| 7,758,067 B2* | 7/2010 | Narin et al. | .................. | 280/730.1 |
| 7,900,961 B2* | 3/2011 | Hanawa et al. | ............ | 280/743.1 |
| 7,950,688 B2* | 5/2011 | Kotikovsky | ................ | 280/728.2 |
| 7,992,898 B2* | 8/2011 | Johansson et al. | ......... | 280/743.1 |
| 8,087,690 B2* | 1/2012 | Kim | .......................... | 280/730.1 |
| 2001/0033072 A1* | 10/2001 | Kumagai et al. | ........... | 280/730.1 |
| 2002/0024200 A1* | 2/2002 | Eckert et al. | ............... | 280/730.1 |

(Continued)

OTHER PUBLICATIONS

Airbag Center: Knee Airbags / Knee Bolst . . . , retrieved: May 20, 2010, pp. 1-2 www.airbagcenter.com/knee_airbags.aspx.

(Continued)

*Primary Examiner* — Karen Beck (74) *Attorney, Agent, or Firm* — Yee & Associates, P.C.

(57) ABSTRACT

The different advantageous embodiments comprise an apparatus comprising an airbag. The airbag is configured to inflate into a configuration that covers a region around a seat in which a top of a head, a front of a head, upper body region, knees, and shins of a passenger in the seat is expected to be located when an event occurs in which the airbag is deployed.

17 Claims, 8 Drawing Sheets

(56) References Cited

U.S. PATENT DOCUMENTS

| | | | |
|---|---|---|---|
| 2003/0015861 A1* | 1/2003 | Abe | 280/730.1 |
| 2004/0124617 A1* | 7/2004 | Morita | 280/732 |
| 2006/0284400 A1* | 12/2006 | Sakakibara et al. | 280/728.2 |
| 2007/0200319 A1* | 8/2007 | Idomoto et al. | 280/729 |
| 2007/0262572 A1* | 11/2007 | Fischer et al. | 280/730.1 |
| 2008/0122205 A1* | 5/2008 | Imamura et al. | 280/730.1 |
| 2009/0179404 A1* | 7/2009 | Peyre et al. | 280/730.1 |
| 2010/0090447 A1* | 4/2010 | Deng et al. | 280/730.1 |
| 2010/0109301 A1* | 5/2010 | Hanawa et al. | 280/730.1 |
| 2010/0237594 A1* | 9/2010 | Hirth et al. | 280/730.1 |
| 2011/0241318 A1* | 10/2011 | Miyajima | 280/730.1 |
| 2011/0260431 A1* | 10/2011 | Kwon | 280/730.1 |
| 2011/0285114 A1* | 11/2011 | Ohara et al. | 280/730.1 |
| 2012/0049492 A1* | 3/2012 | Choi et al. | 280/730.1 |

OTHER PUBLICATIONS

GAO Report on Aviation Safety, Advancements Being Pursued to Improve Airliner Cabin Occupant Safety and Health, GAO-04-33, pp. 1-126.

Knee Airbag / TRW Automotive, retrieved: May 20, 2010, pp. 1-2 www.trw.com/sub_system/knee_airbag.

* cited by examiner

AIRBAG FOR PROTECTION OF MULTIPLE BODY REGIONS

BACKGROUND INFORMATION

1. Field

The present disclosure relates generally to transportation and more particularly to a method and system for transportation safety equipment. Still more particularly, the present disclosure relates to an airbag for protection of multiple body regions.

2. Background

Personal vehicles, such as a car or truck, typically include an airbag system designed to slow the forward motion of a front seat driver or passenger during a vehicle impact event. These airbag systems generally protect the upper body of the driver or passenger, such as the face and chest, from coming into contact with a vehicle dashboard or steering mechanism. Some personal vehicles may also include additional airbags for side impact that deploy from a door or a seat of the vehicle.

Passenger transportation vehicles, such as aircraft, trains, and sea vessels, are not currently required to use airbags. Even without these requirements, some airlines have started to provide airbags in their aircraft.

Therefore, it would be advantageous to have a method and apparatus that addresses one or more of the issues discussed above.

SUMMARY

The different advantageous embodiments comprise an apparatus comprising an airbag. The airbag is configured to inflate into a configuration that covers a region around a seat in which a top of a head, a front of a head, upper body region, knees, and shins of a passenger in the seat is expected to be located when an event occurs in which the airbag is deployed.

The different advantageous embodiments further comprise a system for passenger protection. A concave airbag is configured to inflate and extend over a head of the passenger, before a face of the passenger, before an upper body region of the passenger, and before knees and shins of the passenger. An inflation system is configured to inflate the concave airbag in response to a trigger. A number of sensors is configured to detect an event and generate the trigger to the inflation system to inflate the concave airbag.

The different advantageous embodiments further comprise a method for airbag deployment. An event requiring airbag deployment is detected. An inflation system is triggered to deploy a number of airbags. Propellant is ignited to inflate the number of airbags. Inflation of the number of airbags is maintained for a given period of time.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
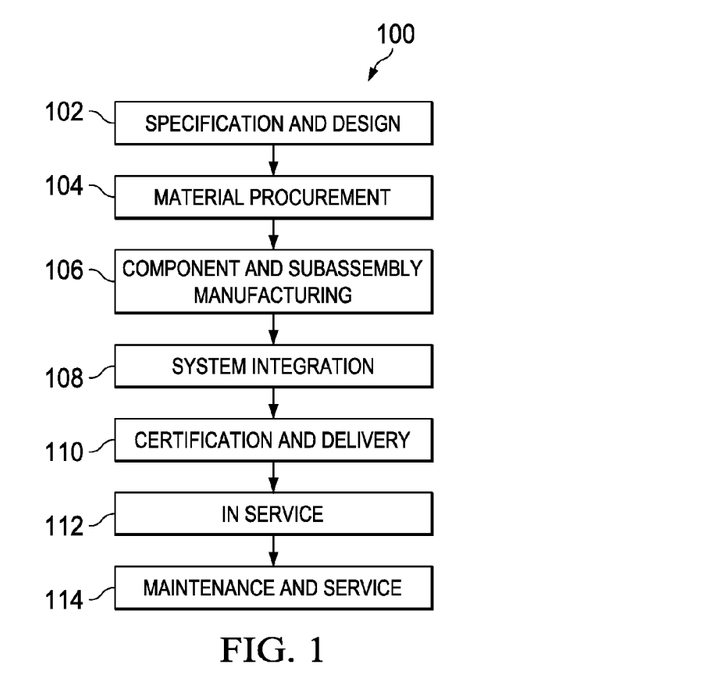
FIG. 1 is an illustration of an aircraft manufacturing and service method in which an advantageous embodiment may be implemented.
Figure 2:
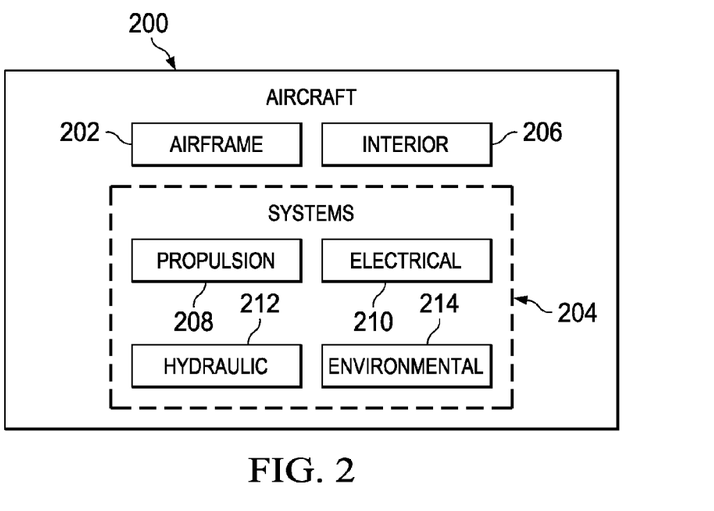
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a need to provide protection for the top of the head, such as from objects falling from above a passenger's head and protection for shins and knees.

Thus, the different advantageous embodiments comprise a system for passenger protection. A concave airbag is configured to inflate and extend over a head of the passenger, before a face of the passenger, before an upper body region of the passenger, and before knees and shins of the passenger. An inflation system is configured to inflate the concave airbag in response to a trigger. A number of sensors is configured to detect an event and generate the trigger to the inflation system to inflate the concave airbag.

The different advantageous embodiments further comprise an apparatus comprising an airbag. The airbag is configured to inflate into a configuration that covers a region around a seat in which a top of a head, a front of a head, upper body region, knees, and shins of a passenger in the seat is expected to be located when an event occurs in which the airbag is deployed.

The different advantageous embodiments further comprise a method for airbag deployment. An event requiring airbag deployment is detected. An inflation system is triggered to deploy a number of airbags. Propellant is ignited to inflate the number of airbags. Inflation of the number of airbags is maintained for a given period of time.

Figure 3:
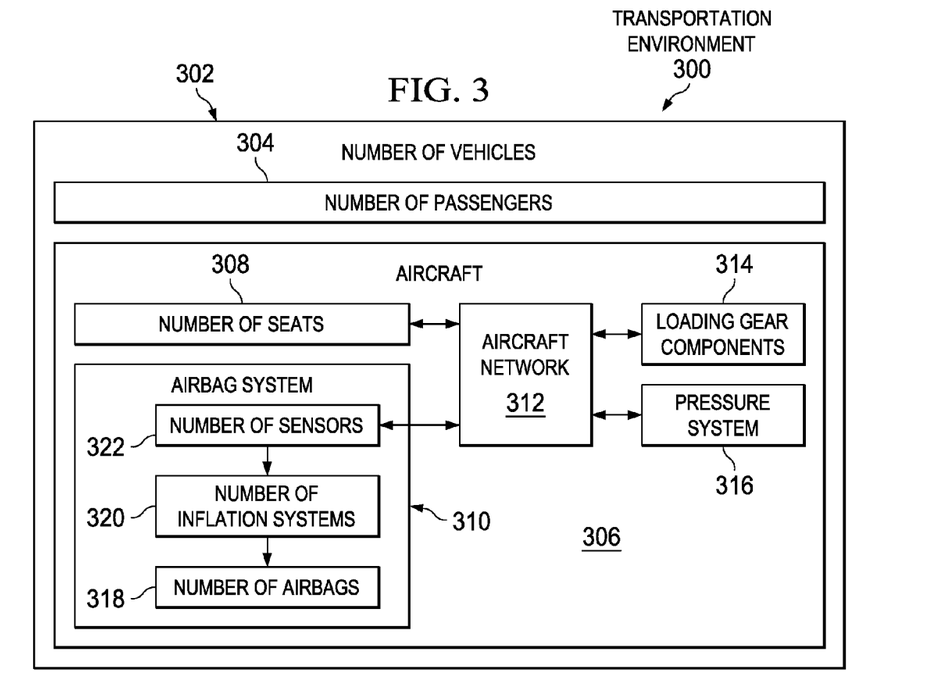
FIG. 3 is a transportation environment in which an advantageous embodiment may be implemented.

With reference now to FIG. 3, a transportation environment is depicted in which an advantageous embodiment may be implemented. Transportation environment 300 may be any type of environment where people are transported by a vehicle. Transportation environment 300 includes number of vehicles 302. Number of vehicles 302 may be any type of vehicle including, for example, without limitation, a personal automobile, a commercial automobile, an off-road vehicle, an aircraft, a rotorcraft, a sea vessel, and a train. In an illustrative example, number of vehicles 302 may be implemented using aircraft 200 in FIG. 2.

Number of passengers 304 may use number of vehicles 302 for transportation. Aircraft 306 is an illustrative example of one type of vehicle in number of vehicles 302. Aircraft 306 includes number of seats 308, airbag system 310, aircraft network 312, landing gear components 314, and pressure system 316.

Number of seats 308 may accommodate number of passengers 304, for example. In the illustrative example of aircraft 306, number of seats 308 may be configured in rows, where most of the seats face the back of another seat, for example. Airbag system 310 may be installed adjacent to or in conjunction with number of seats 308. In one advantageous embodiment, airbag system 310 may be installed along a back portion of each of number of seats 308 in order to provide protection to passengers in the seats facing the back of each seat.

Airbag system 310 includes number of airbags 318, number of inflation systems 320, and number of sensors 322. Number of airbags 318 may be stored in a compressed manner within airbag system 310 until triggered to deploy. Number of airbags 318 is triggered to deploy using number of inflation systems 320. Number of inflation systems 320 receives information from number of sensors 322 indicating that number of airbags 318 should be deployed.

Number of airbags 318 has a surface that faces a passenger when deployed. The surface is a concave curve. The concave curve is such that the number of airbags, when deployed, extends around a region of the body of a passenger in a seat. For example, number of airbags 318 may extend around the upper body region of the passenger to cover the top of the head, front of the face, and upper chest of the passenger. In another illustrative example, number of airbags 318 may extend over the top of the knees, around the front of the knees, and in front of the shins of a passenger in a seat when the passenger is in a seated position.

The shape of number of airbags 318 is configured to protect a number of regions of a passenger's body from objects that may move as a result of an event that causes number of airbags 318 to deploy. The number of regions may be over the top of a passenger's head, before a face of the passenger, before an upper body region of the passenger, over the top of the knees of a passenger, before the knees and shins of the passenger, and/or any other suitable region of the body. The shape of number of airbags 318 with the concave curve surface may take the form of a c-shape, in one advantageous embodiment.

In an illustrative example, an event experienced by aircraft 306 may be detected by number of sensors 322, which send information to number of inflation systems 320 to deploy number of airbags 318. This detection and deployment may occur in milliseconds, for example.

In another illustrative example, number of sensors 322 receives information from landing gear components 314 using aircraft network 312. In yet another illustrative example, number of sensors 322 receives information from pressure system 316 using aircraft network 312. Pressure system 316 may be attuned to specific pressure ranges that would indicate an event requiring number of airbags 318 to deploy for aircraft 306, for example. In an illustrative example, a specific pressure range may be an amount greater than the amount of pressure used in an aircraft landing.

The illustration of transportation environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

As used herein, when a first component is connected to a second component, the first component may be connected to the second component without any additional components.

The first component also may be connected to the second component by one or more other components. For example, one electronic device may be connected to another electronic device without any additional electronic devices between the first electronic device and the second electronic device. In some cases, another electronic device may be present between the two electronic devices connected to each other.

Figure 4:
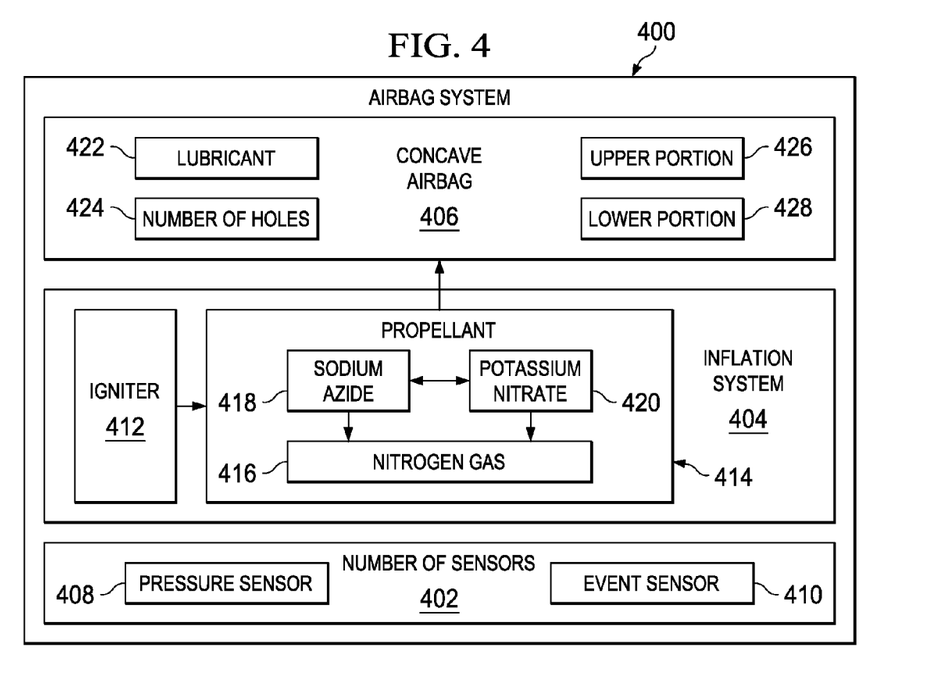
FIG. 4 is an airbag system in accordance with an advantageous embodiment.

With reference now to FIG. 4, an airbag system is depicted in accordance with an advantageous embodiment. Airbag system 400 is an illustrative example of one implementation of airbag system 310 in FIG. 3.

Airbag system 400 includes number of sensors 402, inflation system 404, and concave airbag 406. Concave airbag 406 is an illustrative example of one implementation of number of airbags 318 in FIG. 3. Number of sensors 402 may include pressure sensor 408 and event sensor 410. Pressure sensor 408 may be any type of sensor used to measure atmospheric pressure. Event sensor 410 may be any type of sensor capable of receiving information about an event, such as an impact for example.

Number of sensors 402 detects an event or pressure change that indicates a requirement for airbag deployment, and triggers inflation system 404 to deploy concave airbag 406. Inflation system 404 may include igniter 412 and propellant 414. Igniter 412 ignites propellant 414, creating a large volume of gas which inflates concave airbag 406. The gas may be, for example, nitrogen gas 416, created by a reaction of sodium azide 418 and potassium nitrate 420, in one advantageous embodiment.

Concave airbag 406 may include lubricant 422, number of holes 424, upper portion 426, and lower portion 428. Lubricant 422 is used to maintain pliability of concave airbag 406 while in a compressed storage state. Lubricant 422 may be, for example, without limitation, cornstarch or talcum powder. Number of holes 424 may be dispersed throughout concave airbag 406 in any number of size and location in order to allow for the dissipation of air from concave airbag 406 after inflation. Number of holes 424 may be designed to maintain the inflation of concave airbag 406 for a certain period of time before deflation occurs, for example.

In an illustrative example, upper portion 426 and lower portion 428 may be two different but connected portions of concave airbag 406. Upper portion 426 may be configured to protect the top of the head, front of the face, and upper body region of a passenger, for example. Upper portion 426 may take the form of a c-shape, in one advantageous embodiment. Lower portion 428 may be configured to protect the knees and shins of a passenger, for example. Lower portion 428 may take the form of a c-shape, in one advantageous embodiment.

The illustration of airbag system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in an advantageous embodiment, upper portion 426 and lower portion 428 may each be separate and distinct concave airbags that deploy simultaneously due to propellant 414 of inflation system 404. In this example, upper portion 426 may be configured to protect the top of the head, front of the face, and upper body region of a passenger, for example. Lower portion 428 may be configured to protect the knees and shins of a passenger, in this example.

Figure 5:
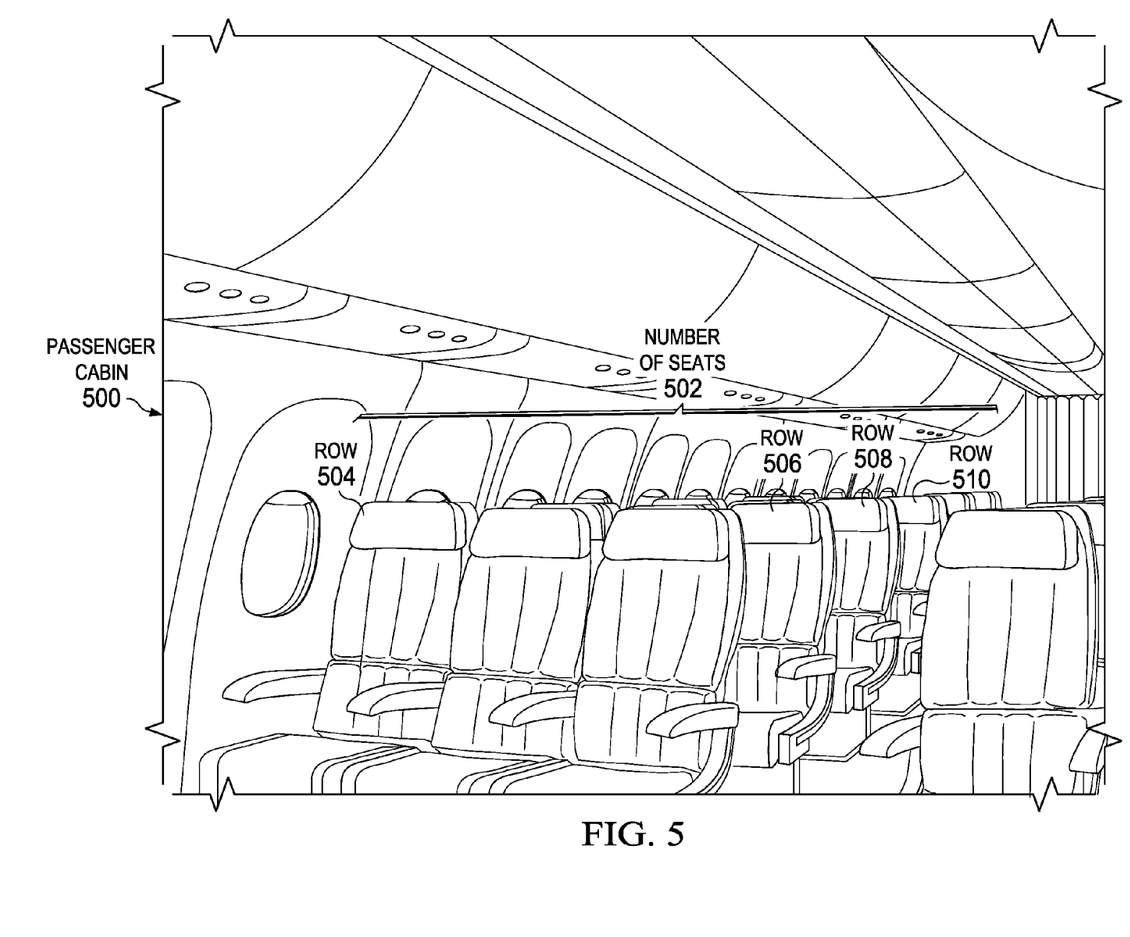
FIG. 5 is a perspective view of a passenger cabin in accordance with an advantageous embodiment.

FIG. 5 is a perspective view of a passenger cabin in accordance with an advantageous embodiment. Passenger cabin 500 may be implemented in interior 206 of aircraft 200 in FIG. 2, in an illustrative example. In another illustrative example, Passenger cabin 500 may be implemented within aircraft 306 in FIG. 3. Passenger cabin 500 includes number of seats 502. Number of seats 502 may be an illustrative example of one implementation of number of seats 308 in FIG. 3. Number of seats 502 may be implemented in rows, such as row 504, row 506, row 508, and row 510, in this illustrative example. Each or rows 504, 506, 508, and 510 may have one or more seats from number of seats 502.

In this illustrative example, row 506 is behind row 504, row 508 is behind row 506, and row 510 is behind row 508. In this embodiment, number of airbags 318 or airbag system 310 in FIG. 3 may be implemented with an airbag along the back side of each seat in number of seats 502, such that a passenger in row 506 is protected by an airbag implemented along the backside of a seat from row 504, for example.

The illustration of passenger cabin 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, passenger cabin 500 may be implemented in a train, bus, boat, ship, and/or any other suitable passenger transportation vehicle, such as number of vehicles 302 in FIG. 3.

Figure 6:
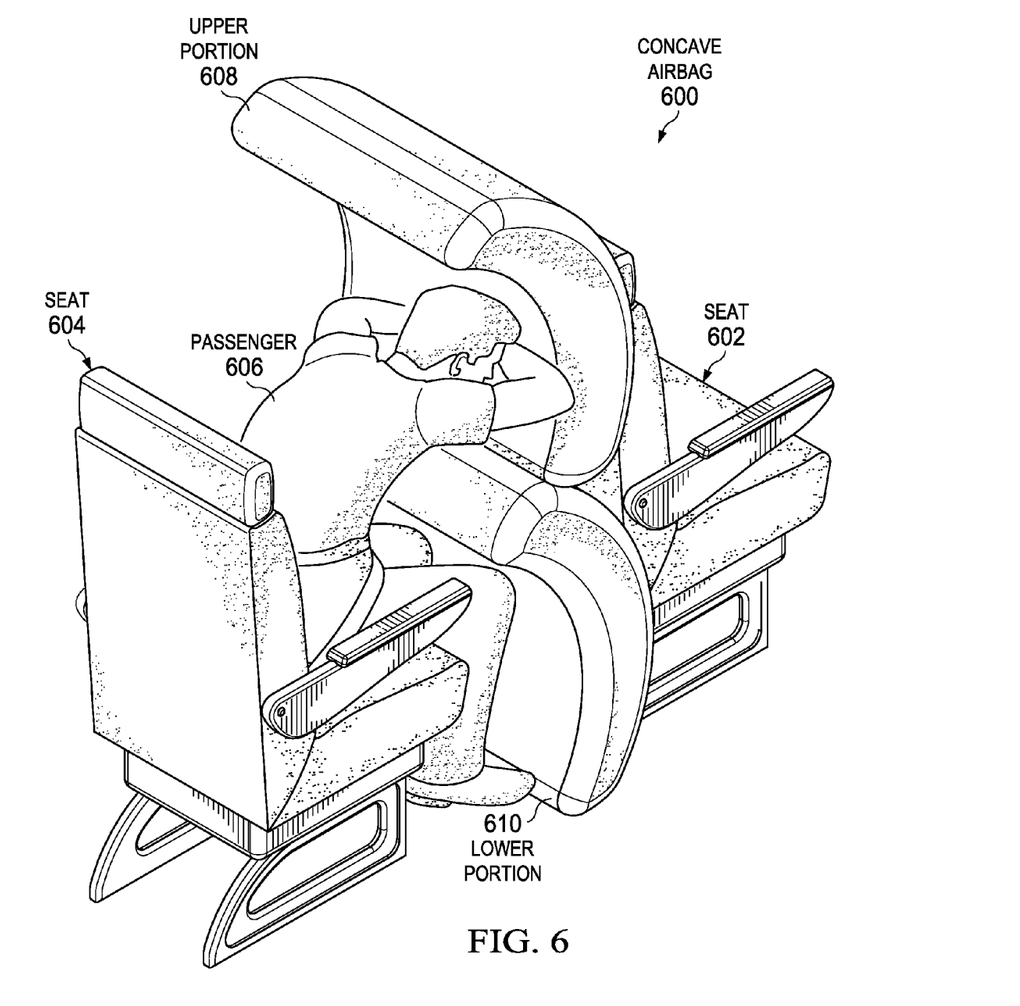
FIG. 6 is a perspective view of a concave airbag in accordance with an advantageous embodiment.

With reference now to FIG. 6, a perspective view of a concave airbag is depicted in accordance with an advantageous embodiment. Concave airbag 600 is an illustrative example of one implementation of number of airbags 318 in FIG. 3 and/or concave airbag 406 in FIG. 4.

Concave airbag 600 may be stored and deploy from the back of passenger seat 602 in this illustrative example. Passenger seat 604 may be located behind passenger seat 602 and include passenger 606. Passenger 606 is facing the back of passenger seat 602 in this illustrative example.

In this illustrative example, concave airbag 600 is deployed in two individual portions, upper portion 608 and lower portion 610. Upper portion 608 and lower portion 610 may be deployed simultaneously by an inflation system, such as inflation system 404 in FIG. 4, for example.

Concave airbag 600 depicts the protection provided to passenger 606. Upper portion 608 is configured to protect the top of the head of passenger 606, the front of the face of passenger 606, and the upper body region of passenger 606. Upper portion 608 may take the form of a c-shape when deployed by inflation system 404 in FIG. 4, in an illustrative example. Lower portion 610 is configured to protect the knees and shins of passenger 606. Lower portion 610 may also take the form of a c-shape when deployed, in an illustrative example.

The illustration of concave airbag 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, concave airbag 600 may be stored in a location other than the back of passenger seat 602. In another advantageous embodiment, upper portion 608 and lower portion 610 may be continuous, as discussed below in FIG. 9.

Figure 7:
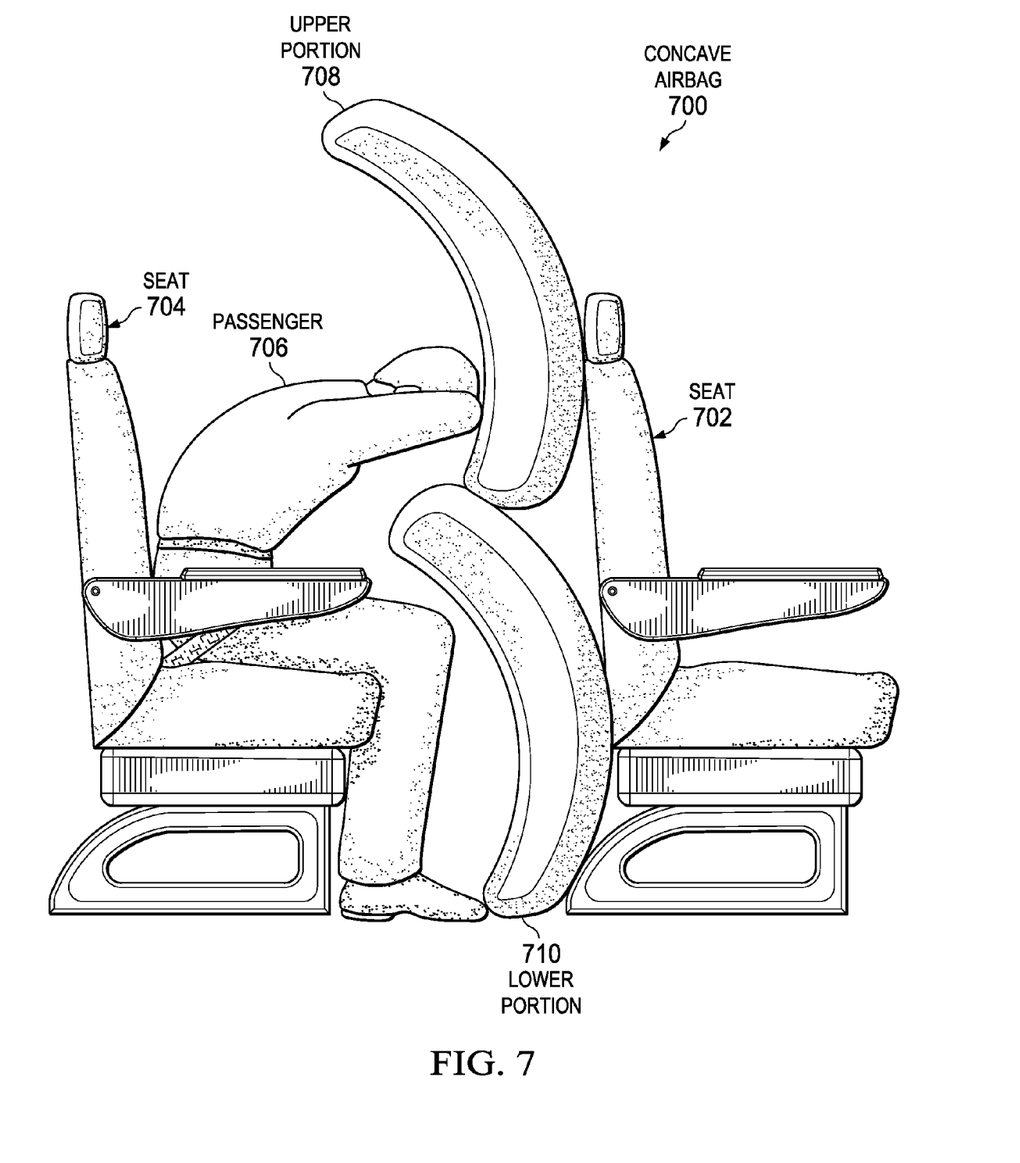
FIG. 7 is a side view of a concave airbag in accordance with an advantageous embodiment.

With reference now to FIG. 7, a side view of a concave airbag is depicted in accordance with an advantageous embodiment. Concave airbag 700 is a side view of concave airbag 600 in FIG. 6. Concave airbag 700 is an illustrative example of one implementation of number of airbags 318 in FIG. 3 and/or concave airbag 406 in FIG. 4.

Concave airbag 700 may be stored and deploy from the back of passenger seat 702 in this illustrative example. Passenger seat 704 may be located behind passenger seat 702 and include passenger 706. Passenger 706 is facing the back of passenger seat 702 in this illustrative example.

This illustrative example of concave airbag 700 depicts the protection provided to passenger 706 by upper portion 708 and lower portion 710. Upper portion 708 is configured to protect the top of the head of passenger 706, the front of the face of passenger 706, and the upper body region of passenger 706. Upper portion 708 may take the form of a c-shape when deployed, in an illustrative example. Lower portion 710 is configured to protect the knees and shins of passenger 706. Lower portion 710 may also take the form of a c-shape when deployed, in an illustrative example.

The illustration of concave airbag 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, concave airbag 700 may be stored in a location other than the back of passenger seat 702. In another advantageous embodiment, upper portion 708 and lower portion 710 may be continuous, as discussed below in FIG. 9.

Figure 8:
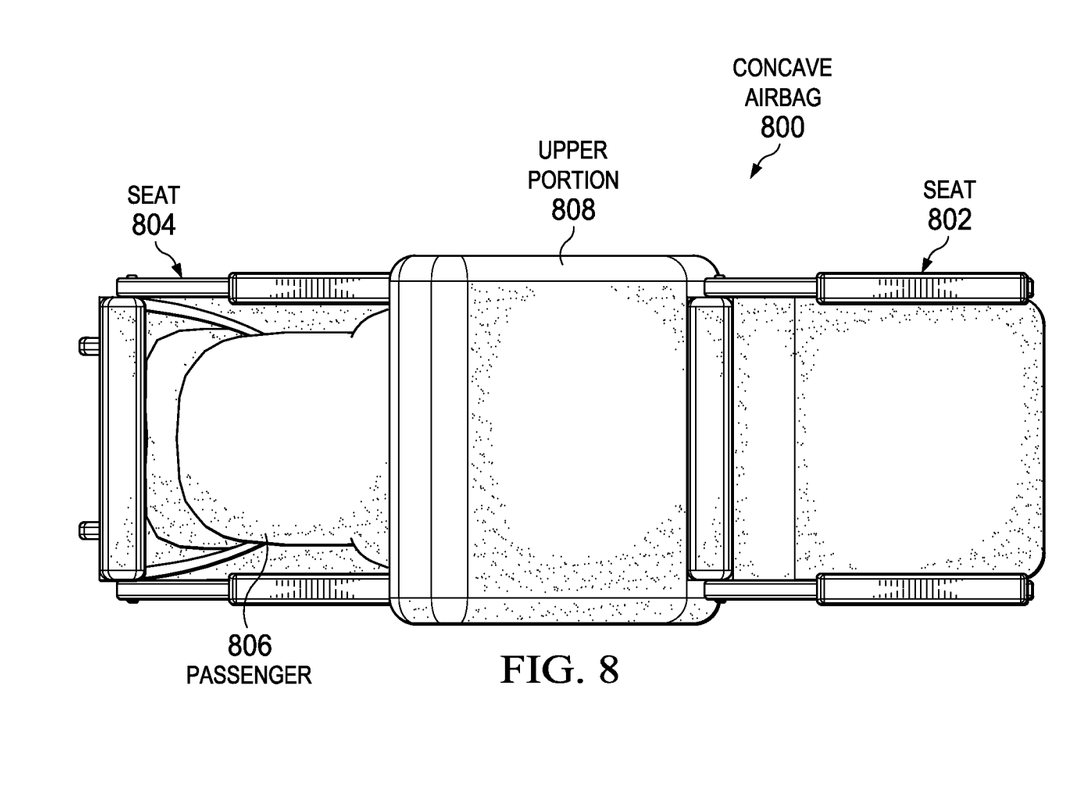
FIG. 8 is a top view of a concave airbag in accordance with an advantageous embodiment.

With reference now to FIG. 8, a top view of a concave airbag is depicted in accordance with an advantageous embodiment. Concave airbag 800 is a top view of concave airbag 600 in FIG. 6 and/or concave airbag 700 in FIG. 7. Concave airbag 800 is an illustrative example of one implementation of number of airbags 318 in FIG. 3 and/or concave airbag 406 in FIG. 4.

Concave airbag 800 may be stored and deploy from the back of passenger seat 802 in this illustrative example. Passenger seat 804 may be located behind passenger seat 802 and include passenger 806. Passenger 806 is facing the back of passenger seat 802 in this illustrative example.

This illustrative example of concave airbag 800 depicts the protection provided to passenger 806 by upper portion 808 of concave airbag 800. Upper portion 808 is configured to protect the top of the head of passenger 806, as well as the front of the face of passenger 806, and the upper body region of passenger 806.

The illustration of concave airbag 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, concave airbag 800 may be stored in a location other than the back of passenger seat 802.

Figure 9:
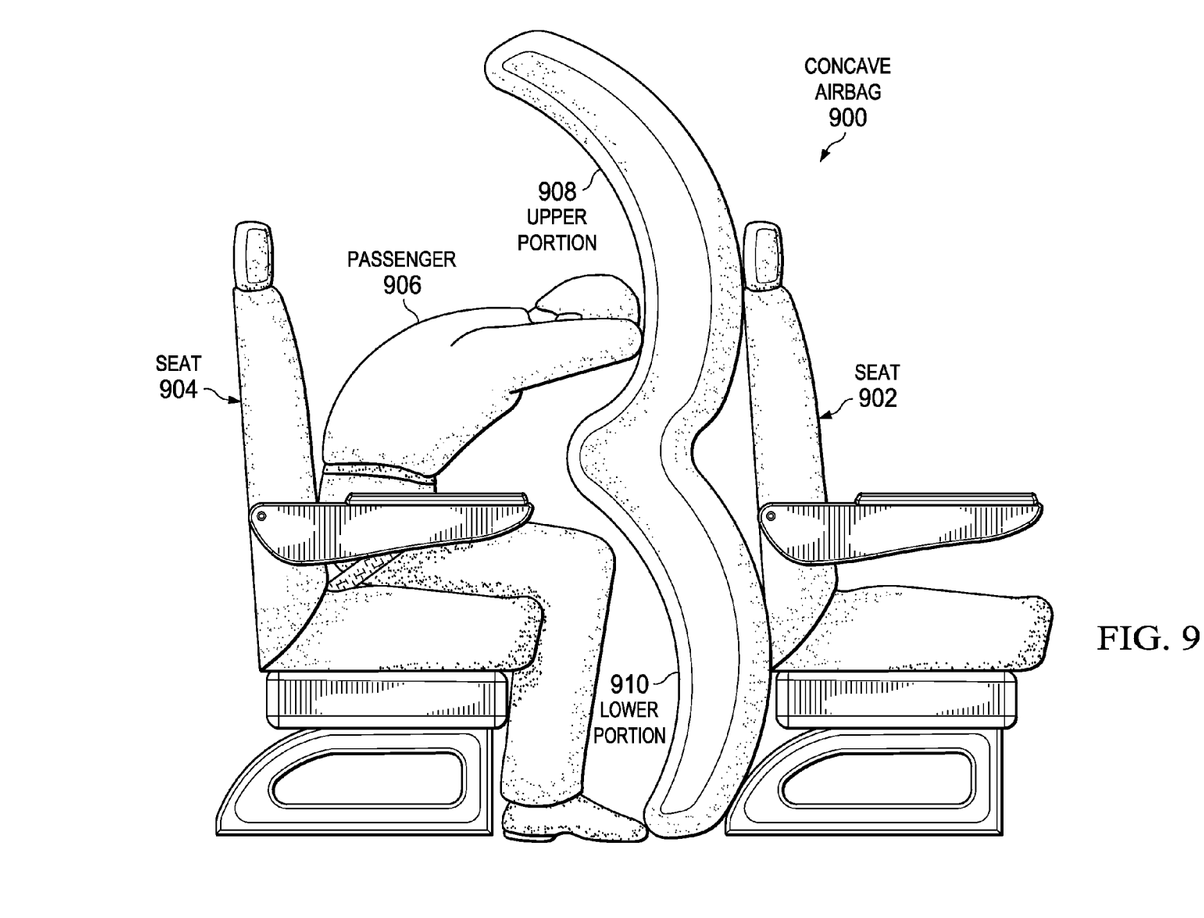
FIG. 9 is a side view of a concave airbag in accordance with an advantageous embodiment.

With reference now to FIG. 9, a side view of a concave airbag is depicted in accordance with an advantageous embodiment. Concave airbag 900 is an illustrative example of one implementation of number of airbags 318 in FIG. 3 and/or concave airbag 406 in FIG. 4.

Concave airbag 900 may be stored and deploy from the back of passenger seat 902 in this illustrative example. Passenger seat 904 may be located behind passenger seat 902 and include passenger 906. Passenger 906 is facing the back of passenger seat 902 in this illustrative example.

This illustrative example of concave airbag 900 depicts upper portion 908 and lower portion 910 of concave airbag 900 in a continuous, connected embodiment. Upper portion 908 and lower portion 910 may have a similar concave curvature without a separation between the two portions. Upper portion 908 is configured to protect the top of the head of passenger 906, the front of the face of passenger 906, and the upper body region of passenger 906. Lower portion 910 is configured to protect the knees and shins of passenger 906. Upper portion 908 and lower portion 910 may each take on a c-shape form or configuration when deployed, in this illustrative example.

The illustration of concave airbag 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
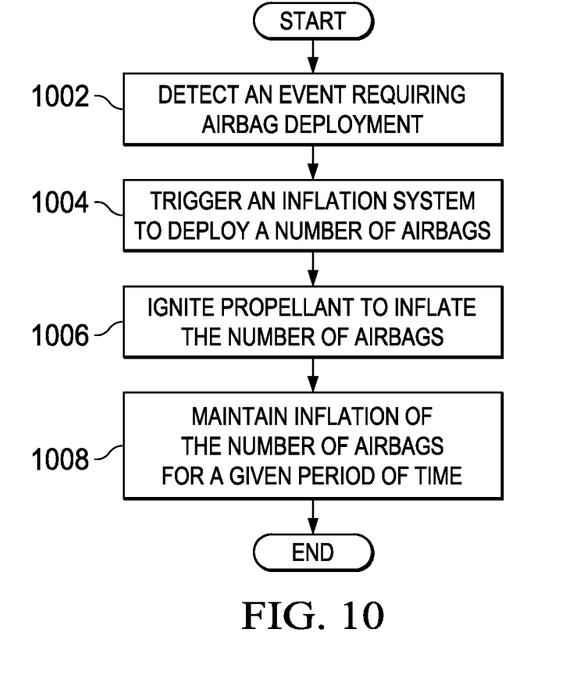
FIG. 10 is a flowchart illustrating a process for airbag deployment in accordance with an advantageous embodiment.

With reference now to FIG. 10, a flowchart illustrating a process for airbag deployment is depicted in accordance with an advantageous embodiment. The process in FIG. 10 may be implemented by a component such as airbag system 400 in FIG. 4, for example.

The process begins by detecting an event requiring airbag deployment (operation 1002). The process may detect the event using a number of sensors, such as number of sensors 402 in FIG. 4, for example. The event may be an impact or pressure change outside an airbag threshold, for example.

The process triggers an inflation system to deploy a number of airbags (operation 1004). The process may trigger an inflation system, such as inflation system 404 in FIG. 4, using information received from number of sensors 402 in FIG. 4, for example. The number of airbags may have a concave curvature and a number of portions for protecting multiple regions of a passenger's body. The number of airbags has a surface that faces a passenger when deployed. The surface is a concave curve such that the number of airbags, when deployed, extends around a region of the body of a passenger in a seat. For example, the number of airbags may extend around the upper body region of the passenger to cover the top of the head, front of the face, and upper chest of the passenger. In another illustrative example, the number of airbags may extend over the top of the knees, around the front of the knees, and in front of the shins of a passenger in a seat when the passenger is in a seated position.

The shape of the number of airbags is configured to protect a number of regions of a passenger's body from objects that may move as a result of the event that triggers the process to deploy the airbags. The shape of the number of airbags with the concave curve surface may take the form of a c-shape, in an illustrative example.

The process then ignites propellant to inflate the number of airbags (operation 1006). The process may use a propellant, such as propellant 414 in FIG. 4, to inflate the airbags. The process then maintains inflation of the number of airbags for a given period of time (operation 1008), with the process terminating thereafter.

The process maintains inflation for a given period of time based on the design of the airbags, such as number of holes 424 in FIG. 4.

The different advantageous embodiments provide an airbag system that protects both the top of the head and face of the passenger as well as the knees and shins of the passenger during an impact event. The passenger is afforded additional protection from flying debris and objects that may be overhead and become unsecured during an impact event. Physical impact and injury is limited for the passenger due to the additional protection afforded by the different advantageous embodiments.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    an airbag, the airbag having a surface with a concave shape relative to a side of the airbag facing a passenger, the airbag configured to inflate into a configuration that covers a region around a seat in which a top of a head, a front of the head, upper body region, knees, and shins of the passenger in the seat is expected to be located when an event occurs in which the airbag is deployed.

2. The apparatus of claim 1, wherein the configuration has a c-shape.

3. The apparatus of claim 1 further comprising:
    an inflation system connected to the airbag, wherein the inflation system is configured to inflate the airbag into the configuration.

4. The apparatus of claim 3 further comprising:
    a sensor system connected to the inflation system, wherein the sensor system is configured to detect the event and send a signal to the inflation system to cause the inflation system to inflate the airbag to the configuration in response to detecting the event.

5. The apparatus of claim 1, wherein the airbag is implemented in an aircraft.

6. A system for passenger protection, the system comprising:
    a number of concave airbags, the number of concave airbags each having a surface with a concave shape relative to a side of the airbag facing a passenger, wherein the number of concave airbags is configured to inflate and extend over a top of a head of the passenger, before a face of the passenger, before an upper body region of the passenger, and before knees and shins of the passenger;
    an inflation system configured to inflate the number of concave airbags in response to a trigger; and
    a number of sensors configured to detect an event and generate the trigger to the inflation system to inflate the number of concave airbags.

7. The system of claim 6, wherein the system is implemented on an aircraft.

8. The system of claim 6, wherein the number of sensors include at least one of a pressure sensor and an event sensor.

9. The system of claim 6, wherein the inflation system uses an igniter and propellant to create gas and inflate the number of concave airbags.

10. The system of claim 6, wherein the number of concave airbags further comprises an upper portion and a lower portion.

11. The system of claim 10, wherein the upper portion and the lower portion are separate and individual airbags that deploy simultaneously, and wherein the upper portion and the lower portion each take on a form of a c-shape when deployed.

12. The system of claim 10, wherein the upper portion and the lower portion are part of one continuous airbag, and wherein the upper portion and the lower portion each take on a form of a c-shape when deployed.

13. A method for airbag deployment, the method comprising:
    detecting an event requiring airbag deployment;
    triggering an inflation system to deploy a number of airbags, wherein the number of airbags has a concave surface relative to a side of the airbag facing a passenger, and wherein the number of airbags takes on a form of a c-shape that extends at least partially over a top of a head of the passenger when deployed;
    igniting propellant to inflate the number of airbags; and
    maintaining inflation of the number of airbags for a given period of time.

14. The method of claim 13, wherein the number of airbags is configured to protect a number of regions of a body of the passenger from objects that may move as a result of the event detected.

15. The method of claim 14, wherein the number of regions include at least one of the top of a head, front of a face, upper chest, top of knees, front of the knees, and front of shins.

16. The method of claim 13, wherein the number of airbags is implemented on an aircraft.

17. A system for protection of a passenger, the system comprising:
    a concave airbag system, comprising at least one concave airbag configured to inflate and extend over a top of a head of the passenger, before a face of the passenger, before an upper body region of the passenger, and before knees and shins of the passenger, wherein the concave airbag system has a concave surface relative to a side of the airbag facing the passenger and further comprises an upper portion and a lower portion, and wherein the upper portion and the lower portion are at least one of separate and individual airbags that deploy simultaneously and one continuous airbag, and wherein the upper portion and the lower portion each take on a form of a c-shape when deployed;
    an inflation system configured to inflate the concave airbag system in response to a trigger, wherein the inflation system uses an igniter and propellant to create gas and inflate the concave airbag system; and
    a number of sensors configured to detect an event and generate the trigger to the inflation system to inflate the concave airbag system, wherein the number of sensors include at least one of a pressure sensor and an event sensor, and wherein the inflation system is implemented on an aircraft.

\* \* \* \* \*